United States Patent
Gibeau

(10) Patent No.: US 9,577,230 B2
(45) Date of Patent: Feb. 21, 2017

(54) INTEGRATED HIGH VOLTAGE SERVICE DISCONNECT FOR TRACTION BATTERIES

(71) Applicant: FORD GLOBAL TECHNOLOGIES, LLC, Dearborn, MI (US)

(72) Inventor: John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 14/226,971

(22) Filed: Mar. 27, 2014

(65) Prior Publication Data

US 2015/0280182 A1    Oct. 1, 2015

(51) Int. Cl.
*H01M 2/10* (2006.01)
*H01M 2/34* (2006.01)

(52) U.S. Cl.
CPC ............. *H01M 2/1077* (2013.01); *H01M 2/34* (2013.01); *H01M 2220/20* (2013.01)

(58) Field of Classification Search
CPC .. H01M 2/1077; H01M 2/34; H01M 10/5053; H01M 10/5057; H01M 10/5016
See application file for complete search history.

(56) References Cited

U.S. PATENT DOCUMENTS

| 7,402,068 | B1  |   | 7/2008  | Tarchinski       |         |
|-----------|-----|---|---------|------------------|---------|
| 8,305,034 | B2  |   | 11/2012 | Rubio            |         |
| 8,975,774 | B2  | * | 3/2015  | Kreutzer         | 307/10.1 |
| 2010/0084205 | A1 |  | 4/2010  | Tarchinski et al.|         |

FOREIGN PATENT DOCUMENTS

WO    WO 2012/152444    * 11/2012 ............ H01M 2/02

* cited by examiner

*Primary Examiner* — Raymond Alejandro
(74) *Attorney, Agent, or Firm* — Dabid B. Kelley; Brooks Kushman P.C.

(57) ABSTRACT

A traction battery includes a battery housing having a tray and a cover cooperating to define an interior. A plurality of battery cells are arranged in an array and disposed on the tray within the interior. A service disconnect base is disposed on an exterior surface of the housing and includes a uni-terminal connector having a receptacle disposed within the base and electrically connected to the battery cells. A service disconnect plug is integrally incorporated with a single high voltage cable that is partially disposed in the plug. The service disconnect plug includes a body configured to mechanically engage the base and a prong mechanically connected to the high voltage cable and configured to be received within the receptacle to create an electrical connection between the battery cells and a high voltage bus when the body is engaged with the base. The plug may include a cover portion that encloses a terminal disposed on the housing.

14 Claims, 3 Drawing Sheets

INTEGRATED HIGH VOLTAGE SERVICE DISCONNECT FOR TRACTION BATTERIES

TECHNICAL FIELD

This disclosure relates to battery service disconnects for hybrid and electric vehicles to limit exposure to high voltage electrical potentials.

BACKGROUND

Vehicles such as battery-electric vehicles (BEVs), plug-in hybrid electric vehicles (PHEVs) or full hybrid-electric vehicles (FHEVs) contain a traction battery assembly to act as an energy source for the vehicle. The traction battery may include components and systems to assist in managing vehicle performance and operations. The traction battery may also include high voltage components. Limiting exposure to the high voltage potentials may be advantageous.

SUMMARY

In one embodiment, a traction battery includes a battery housing. A service disconnect base is disposed on an exterior surface of the housing and includes a uni-terminal connector. The uni-terminal connectors is disposed within the base and electrically connected to battery cells disposed within the housing. A service disconnect plug includes a body configured to mechanically engage the base and cabling configured to electrically connect the uni-terminal to a high voltage bus when the body is engaged with the base.

In another embodiment, a traction battery comprises a housing including a service disconnect base having a connector electrically connected with cells. A terminal is disposed on the housing and is electrically connected with the cells. A service disconnect plug includes a cover portion and a vehicle cable mechanically engageable with the connector to electrically connect a high voltage bus with the cells. The cover portion and housing form an enclosure around the terminal to limit access to the terminal.

In yet another embodiment, a traction battery includes a battery housing having a plurality of cells disposed therein. A service disconnect is disposed on an exterior surface of the housing and includes a uni-terminal and a high-voltage vehicle cable disposed within the service disconnect. The uni-terminal mechanically engages with the high voltage vehicle cable to electrically connect a high voltage vehicle cable to the cells when the service disconnect is disconnected.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
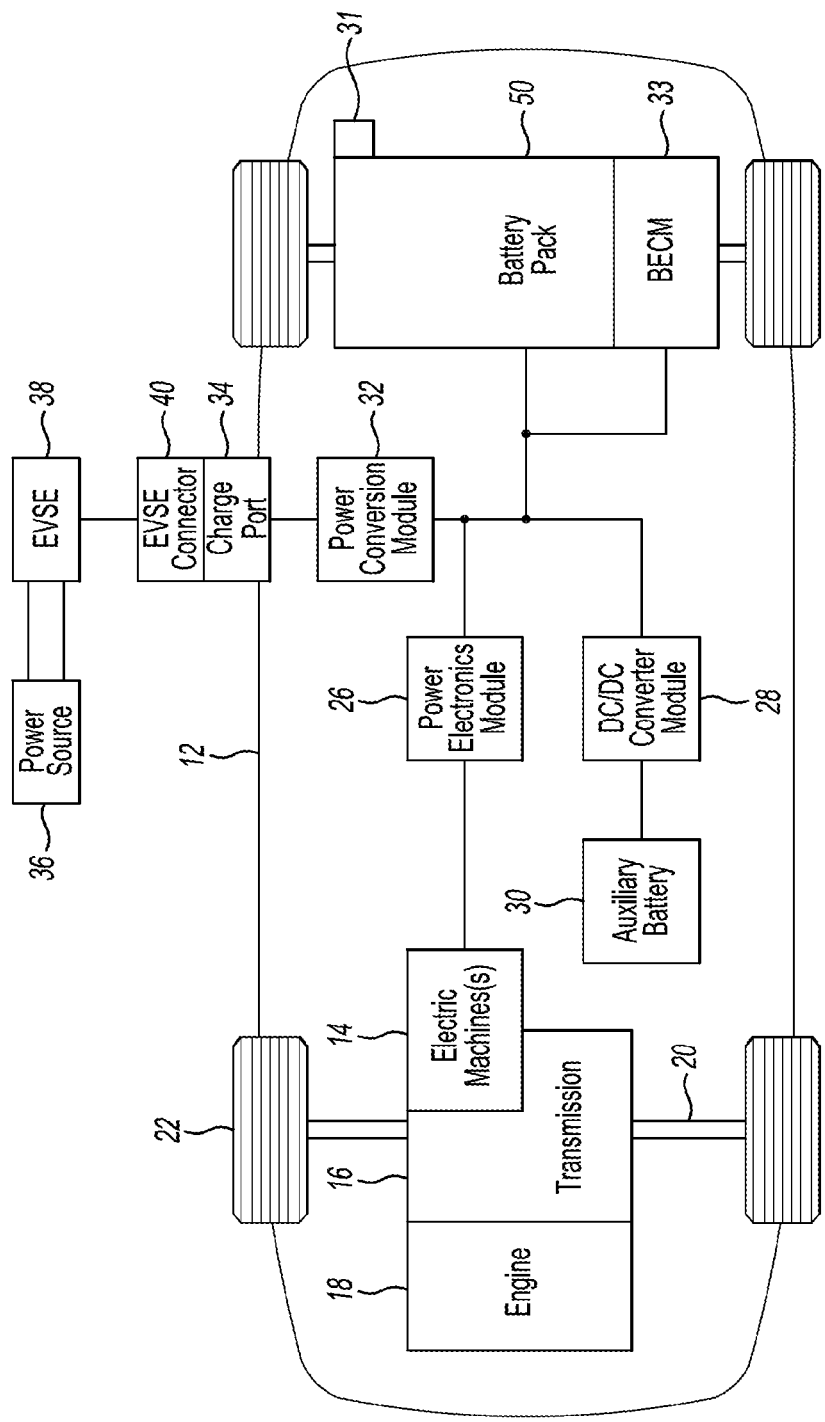
FIG. 1 depicts a schematic of a typical plug-in hybrid-electric vehicle.

FIG. 1 depicts a schematic of a typical plug-in hybrid-electric vehicle (PHEV). The vehicle 12 includes one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic or pouch cell, may include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Figure 2:
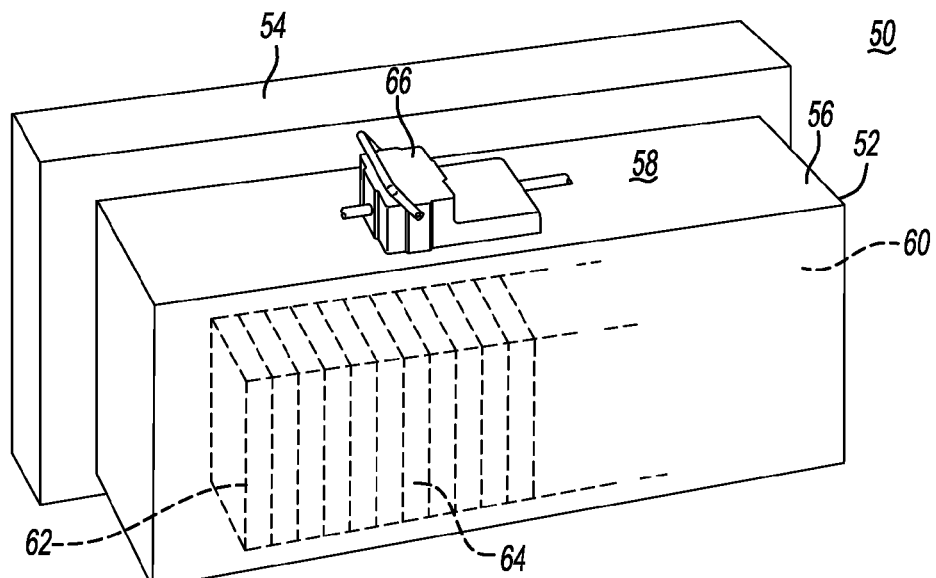
FIG. 2 illustrates a traction battery assembly.

Referring to FIG. 2, a traction battery assembly or battery pack 50 is shown. The traction battery assembly 50 includes a battery housing 52. The battery housing 52 includes a tray 54 and a cover 56 cooperating to define a chamber 60 when the cover 56 is attached to the tray 54. A plurality of battery components are disposed within the chamber 60. The components may include contactors, resistors, controllers, battery cells and other electrical components. One or more battery arrays 62 may also be disposed within the chamber 60. Each battery array 62 includes a plurality of stacked cells 64. The battery array 62 may be electrically connected with the components via circuitry. A service disconnect 66 is provided on an exterior surface 58 of the housing 52. The service disconnect 66 acts as a hard-wire kill-switch. When the service disconnect 66 is disengaged, an open is created in the high voltage circuit leading to the external pack terminal. The circuitry and at least some of the components inside the chamber 60 are also de-energized. The cover 56 and the service disconnect 66 may be arranged such that the cover 56 cannot be removed without first disengaging the service disconnect 66. Similarly, the cover 56 and service disconnect 66 may be arranged such that the service disconnect 66 cannot be re-engaged without the cover 56 being attached to the tray 54.

Figure 3:
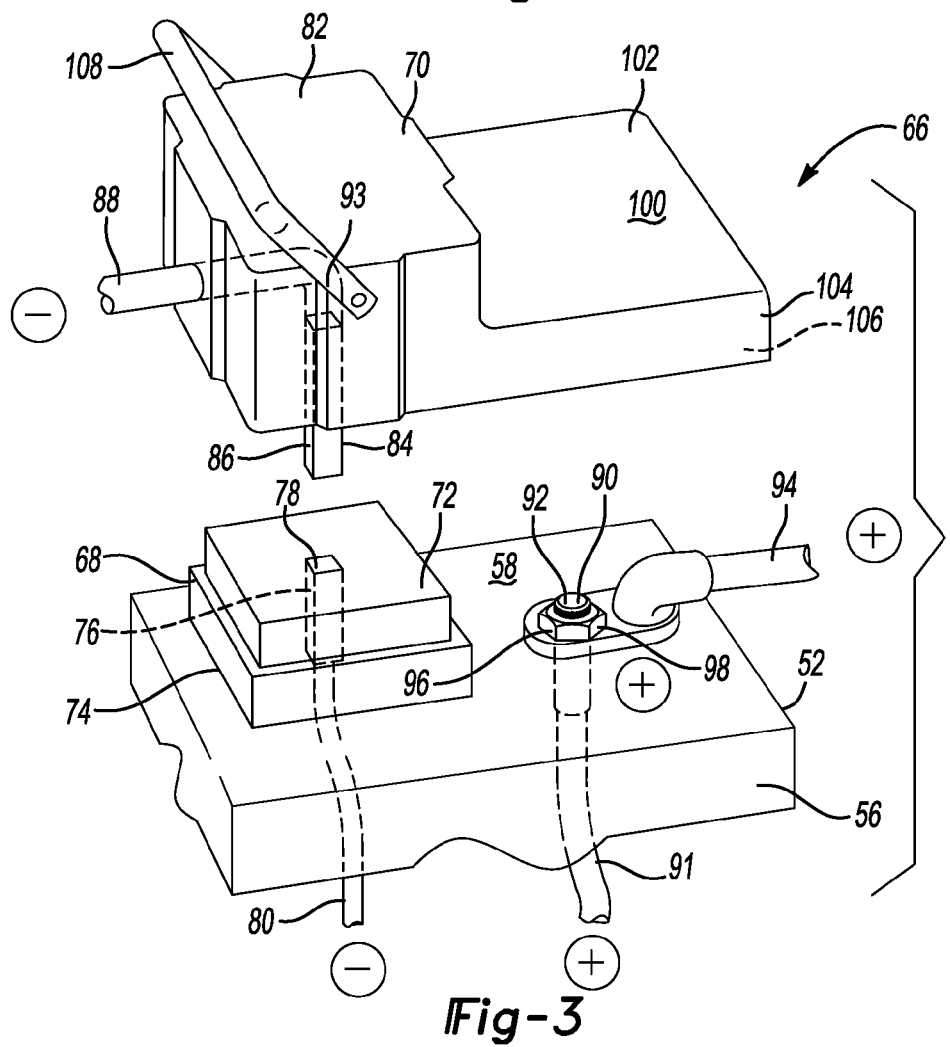
FIG. 3 illustrates a detail of a service disconnect.

Referring to FIG. 3, magnified view of the service disconnect 66 is shown. The service disconnect 66 includes a service disconnect plug 70 and a service disconnect base 68. The service disconnect plug 70 is receivable within the service disconnect base 68. Alternatively, the base 68 may be receivable within the plug 70. The service disconnect plug 70 can also be disconnected from the service disconnect base 68. Removing the disconnect plug 70 from the service disconnect base 68 creates an open in the high voltage circuit electrically connected to the external pack terminal 90.

The service disconnect base 68 includes a top 72 and a bottom 74. The bottom 74 is attached to an exterior surface 58 of the housing. The service disconnect base 68 may be integrally formed with the housing 52. The service disconnect base 68 may be made of a nonconductive material, such as plastic. The service disconnect base 68 includes a uni-terminal 76 disposed within the base 68. The uni-terminal 76 is shown as a "negative" uni-terminal, however the uni-terminal 76 could be a "positive" uni-terminal. The uni-terminal 76 includes a female receptacle 78 and a cable 80. The cable 80 electrically connects the uni-terminal 76 to the components and the battery array 62. The female receptacle 78 is made of an electrically conductive material and is configured to receive at least a portion of the service disconnect plug 70.

The service disconnect plug 70 includes a body 82 configured to mechanically engage at least a portion of the service disconnect base 68 when the service disconnect plug 70 is connected with the service disconnect base 68. The service disconnect plug 70 includes a male prong 84 that is partially disposed within the body 82 and has a protruding portion 86 that extends outwardly from the body 82. The male prong 84 is made of an electrically conductive material. The male prong 84 is configured to be received within the female receptacle 78 when the service disconnect plug 70 is connected to the service disconnect base 68. Inserting the prong 84 into the receptacle 78 closes at least a portion of the circuitry. A portion of the "negative" high voltage vehicle cable (HVVC) 88 is disposed within the body 82. The HVVC 88 could also be a "positive" HVVC when the uni-terminal 76 is a "positive" uni-terminal. The HVVC 88 has a first end 93 that is electrically connected with the male prong 84 and a second end (not shown) that is electrically connected to the high-voltage bus or directly connected to an electric machine.

The uni-terminal 76 electrically connects the HVVC 88 with the components and the battery array 62 when the prong 84 is received within the receptacle 78. The HVVC 88 is de-energized when the uni-terminal 76 is disconnect from the prong 84, which occurs when the service disconnect 66 is disengaged.

The prong 84 and receptacle 78 are shown as a square; however other configurations are contemplated such as rectangular or round. It may be advantageous to provide finger protection for the service disconnect base 68 so that a finger or tool may not inadvertently contact the female receptacle 78. Non-limiting examples of finger protection include a prong and receptacle that are wide and skinny, or recessing the receptacle deeper into the service disconnect base.

An external pack terminal 90 is disposed on an exterior surface 58 of the housing 52. The terminal 90 is shown as a "positive" terminal but could also be a "negative" terminal. The terminal 90 is electrically connected with the battery array 62 via circuitry 91. The terminal 90 may be a threaded stud 92. A second high voltage vehicle cable (HVVC) 94 is attached to the terminal 90 to electrically connect the cable 94 to the circuitry 91. The HVVC 94 is shown as a "positive" HVVC, but could be a "negative" HVVC when the terminal 90 is a "negative" terminal. The HVVC 94 may include an eyelet 96 received on the stud 92 and secured to the stud 92 with a nut 98. The HVVC 94 delivers power from the battery array 62 to the high voltage bussing or directly to an electric machine. The bolt-on connection is a simple and inexpensive means of attachment that may reduce cost and increase efficiency in the manufacturing process. Other mechanical joining techniques for the terminal-cable connection are contemplated by the present disclosure.

The terminal 90 is conductive and may discharge electricity when touched if the circuitry is energized. The service disconnect 66 may include a cover portion 100 to limit exposure to the terminal 90. The cover portion 100 includes a cover top 102 and sidewalls 104 defining an enclosure 106. The terminal 90 is disposed within the enclosure 106 when the service disconnect plug 70 is connected with the service disconnect base 68 to limit access to the terminal 90. The sidewalls 104 fit closely against the housing outer surface 58 to prevent objects from entering the enclosure 106 when the service disconnect 66 is connected.

The service disconnect 66 may include a mechanical locking mechanism to secure the service disconnect plug 70 to the service disconnect base 68. Including a locking mechanism in the service disconnect 66 eliminates the need to use tools to remove the service disconnect plug 70 from the service disconnect base 68. For example, the plug 70 and base 68 may include cooperating components that mechanically engage and disengage via an actuator 108. The actuator may be a handle 108 which engages and disengages the cooperating locking components in the plug 70 and base 68. The service disconnect 66 may also be designed to have a removal time delay. The time delay slows the removal time of the plug 70, which helps to ensure that the circuitry has completely de-energized before the service disconnect plug 70 is removed from the service disconnect base 68.

Figure 4:
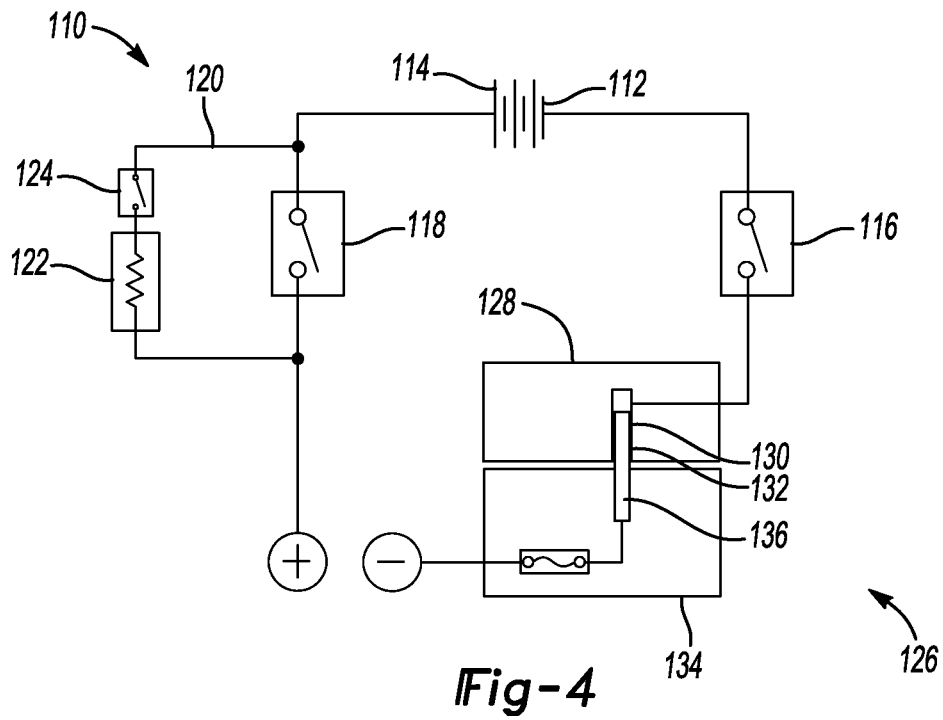
FIG. 4 is an electrical schematic of circuitry associated with the service disconnect switch.

FIG. 4 illustrates the circuitry. The circuitry 110 is electrically connected with a plurality of battery cells 114. The cells 114 may be arranged in an array 112. The cells 114 provide energy to the circuitry 110 and power at least one electric machine. The circuitry 110 also includes a first contactor 116 and a second contactor 118. The contactors 116, 118 are switches that open and close the circuitry 110. The opening and closing of the contactors may be controlled by one or more controllers. A pre-charge circuit 120 may be included in the circuitry 110. The pre-charge circuit 120 is provided on the positive side of the circuitry 110. Alternatively, the pre-charge circuit 120 may be provided on the negative side of the circuitry 110. The pre-charge circuit 120 includes a resistor 122 and a pre-charge contactor 124. The pre-charge circuit 120 is utilized during initial startup of the circuitry 110.

The circuitry 110 also includes a service disconnect 126. The service disconnect includes a service disconnect base 128. The base 128 includes a uni-terminal 130 that is electrically connected with the circuitry 110. The uni-terminal 130 is depicted as a "negative" uni-terminal, however the uni-terminal may also be "positive". The uni-terminal 130 includes a female receptacle 132. The service disconnect 126 also includes a service disconnect plug 134. The service disconnect plug 134 includes a prong 136 which is received within the service disconnect female receptacle 132. The service disconnect 126 is a switch and creates an open in the circuit when the service disconnect plug 134 is removed from the service disconnect base 128.

Figure 5:
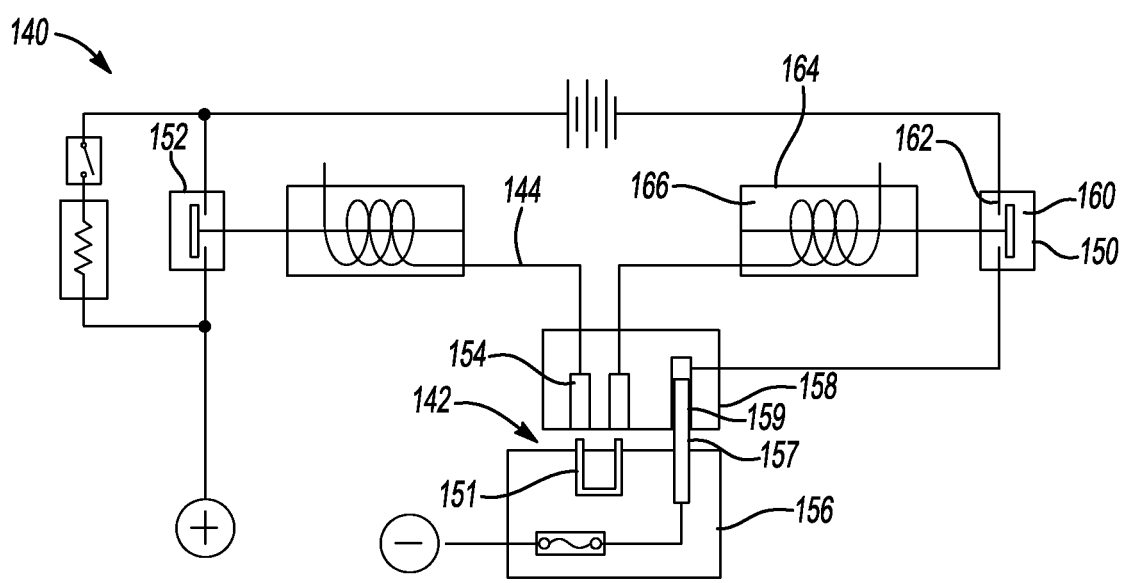
FIG. 5 is an electrical schematic of alternative circuitry associated with the service disconnect switch that includes an interlock switch.

Referring to FIG. 5, an alternative circuitry 140 shown that includes an interlock switch 142. The interlock switch 142 is an additional kill-switch. The interlock switch 142 is electrically connected to the circuitry 140 with interlock circuitry 144. The interlock circuitry 144 is a low-voltage circuit connecting the interlock switch 142 with actuators 146 that open and close the contactors 150, 152. When the interlock switch 142 is open, the contactors 150, 152 are also open and the circuitry 140 is de-energized. The interlock switch 142 includes an interlock connector 151 and an interlock receptacle 154. The interlock connector 151 may be partially embedded in the service disconnect plug 156 and may project outwardly from the service disconnect plug 156. The interlock connector 151 may be a strip of metal. The interlock receptacles 154 may be disposed within the service disconnect base 158. The interlock receptacles 154 receive the interlock connector 151 when the interlock switch 142 is closed.

Removing the service disconnect plug 156 from the service disconnect base 158 opens the interlock switch 142. The interlock switch 142 may be arranged to open before the service disconnect opens. Opening the interlock switch 142 first de-energizes the circuitry 140 prior to the removal of the service disconnect plug 156 from the service disconnect base 158. This prevents arcing between the prong 157 and the female receptacle 159 when the service disconnect plug 156 is removed from the service disconnect base 158. Having both the interlock switch 142 and the service disconnect also provides a redundancy in the rare event that one of them fails.

Each of the contactors 150, 152 includes a movable plunger 160 and contacts 162. The contactors 150, 152 are closed when the plunger 160 and the contacts 162 are touching and open when not touching. The plunger 160 is spring biased to an open (de-energized) position. The plunger 160 is controlled by an actuator 164. The actuator 164 is electrically connected with the interlock circuitry 144 and is controlled by the interlock switch 142. The actuator 164 is configured to overcome the spring bias and pull the plunger 160 against the contacts 162 when the interlock switch 142 is closed. The actuator 164 may include a wire coil 166 wrapped around a shaft of the plunger 160. The wire coil 166 magnetically pulls the plunger 160 against the contacts 162 in response to a voltage signal from the closed interlock switch 142. Alternatively, the interlock circuitry 144 may be used to monitor the disconnection of the service disconnect but does not necessarily provide the current that drives the contactors to be held closed directly. In this configuration the contactors 150, 152 may be opened and closed by components other than the interlock circuitry 144, such as by a controller. These examples are not limiting and a person having ordinary skill in the art will appreciate other configurations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery comprising:
   a battery housing including a tray and a cover cooperating to define an interior;
   a plurality of battery cells arranged in an array and disposed on the tray within the interior;
   a service disconnect base disposed on an exterior surface of the battery housing, and including a uni-terminal connector having a receptacle disposed within the service disconnect base and electrically connected to the plurality of battery cells; and
   a service disconnect plug integrally incorporated with a single high voltage cable that is partially disposed in the service disconnect plug, the service disconnect plug including a body configured to mechanically engage the service disconnect base, and a prong mechanically connected to the single high voltage cable and configured to be received within the receptacle to create an electrical connection between the battery cells and a high voltage bus when the body is engaged with the service disconnect base.

2. The traction battery of claim 1 further comprising an interlock switch including an interlock connector and an interlock receptacle, wherein the interlock switch is configured to de-energize the uni-terminal connector when the interlock connector is removed from the interlock receptacle.

3. The traction battery of claim 1 wherein the service disconnect base is disposed on an exterior surface of the cover.

4. The traction battery of claim 3 wherein the service disconnect plug and the cover are arranged such that the cover cannot be removed from the tray unless the service disconnect plug is removed from the service disconnect base.

5. The traction battery of claim 1 further comprising an interlock switch including a interlock connector attached to the service disconnect plug and an interlock receptacle disposed in the service disconnect base, and arranged such that the interlock connector is removed from the interlock receptacle when the service disconnect plug is at least partially removed from the service disconnect base, wherein the uni-terminal connector is de-energized when the interlock connector is removed from the interlock receptacle.

6. The traction battery of claim 1 wherein the uni-terminal connector is a negative uni-terminal connector.

7. The traction battery of claim 1 wherein the service disconnect plug further includes a cover portion cooperating with the battery housing to form an enclosure around a second terminal to limit access to the second terminal.

8. The traction battery of claim 7 wherein the uni-terminal connector is a negative uni-terminal connector and the second terminal is a positive terminal.

9. A traction battery comprising:
   a housing defining an interior and at least one sidewall;
   battery cells disposed in the interior;
   a service disconnect base disposed on the sidewall and including a uni-terminal connector electrically connected to the battery cells;
   a terminal disposed on exterior surface of the sidewall and electrically connected with the battery cells, wherein the terminal and the uni-terminal connector have opposite polarities;
   a first high voltage cable mechanically connected to the terminal to electrically connect the terminal to an electric machine; and
   a service disconnect plug including a second high voltage cable having a polarity opposite a polarity of the first high voltage cable and mechanically engageable with the uni-terminal connector to electrically connect the uni-terminal connector with the electric machine, wherein the service disconnect plug further includes a cover portion cooperating with the sidewall to form an enclosure around the terminal to limit access to the terminal when the service disconnect plug engages the service disconnect base.

10. The traction battery of claim 9 further comprising an interlock switch including an interlock connector and an interlock receptacle, wherein the interlock switch is configured to de-energize the terminal when the interlock connector is removed from the interlock receptacle.

11. The traction battery of claim 9 wherein the cover portion includes a top and sidewalls defining at least a portion of the enclosure.

12. The traction battery of claim 9 wherein the second high voltage cable includes a prong that projects outwardly from the service disconnect plug and is receivable within the uni-terminal connector.

13. The traction battery of claim 12 wherein the uni-terminal connector includes a female receptacle configured to receive the prong when the service disconnect plug is connected with the service disconnect base.

14. The traction battery of claim 9 wherein the terminal is a threaded stud and the first high voltage cable is secured to the terminal by a fastener.

* * * * *